US009940539B2

(12) United States Patent
Han et al.

(10) Patent No.: US 9,940,539 B2
(45) Date of Patent: Apr. 10, 2018

(54) OBJECT RECOGNITION APPARATUS AND METHOD

(71) Applicants: SAMSUNG ELECTRONICS CO., LTD., Suwon-si (KR); POSTECH ACADEMY-INDUSTRY FOUNDATION, Pohang-si (KR)

(72) Inventors: Bohyung Han, Seoul (KR); Seunghoon Hong, Seoul (KR); Hyeonwoo Noh, Gunpo-si (KR)

(73) Assignees: SAMSUNG ELECTRONICS CO., LTD., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 168 days.

(21) Appl. No.: 15/147,665

(22) Filed: May 5, 2016

(65) Prior Publication Data

US 2016/0328630 A1 Nov. 10, 2016

Related U.S. Application Data

(60) Provisional application No. 62/158,689, filed on May 8, 2015.

(30) Foreign Application Priority Data

Nov. 19, 2015 (KR) .................. 10-2015-0162837

(51) Int. Cl.
*G06K 9/00* (2006.01)
*G06K 9/46* (2006.01)
*G06K 9/62* (2006.01)

(52) U.S. Cl.
CPC ......... *G06K 9/4628* (2013.01); *G06K 9/6272* (2013.01)

(58) Field of Classification Search
CPC ........ G06F 17/2785; G06K 2009/4666; G06K 9/46; G06K 9/4676; G06K 9/6267; G06K 9/66; G06N 3/02
See application file for complete search history.

(56) References Cited

U.S. PATENT DOCUMENTS 9,053,222 B2 * 6/2015 Lynn ..................... G06F 19/321
9,754,351 B2 * 9/2017 Paluri ................... G06T 3/4046
(Continued)

OTHER PUBLICATIONS

Liang-Chieh Chen, et al; "Semantic Image Segmentation with Deep Convolutional Nets and Fully Connected CRFs"; ICLR; 2015; 14 pgs. total.
(Continued)

*Primary Examiner* — Bhavesh Mehta
*Assistant Examiner* — Ian Lemieux
(74) *Attorney, Agent, or Firm* — Sughrue Mion, PLLC

(57) ABSTRACT

An object recognition apparatus and method thereof are disclosed. An exemplary apparatus may determine an image feature vector of a first image by applying a convolution network to the first image. The convolution network may extract features from image learning sets that include the first image and a sample segmentation map of the first image. The exemplary apparatus may determine a segmentation map of the first image by applying a deconvolution network to the determined image feature vector. The exemplary apparatus may determine a weight of the convolution network and a weight of the deconvolution network based on the sample segmentation map and the first segmentation map. The exemplary apparatus may determine a second segmentation map of a second image through the convolution network using the determined weight of the convolution network and through the deconvolution network using the determined weight of the deconvolution network.

13 Claims, 8 Drawing Sheets

(56) References Cited

U.S. PATENT DOCUMENTS

| | | | |
|---|---|---|---|
| 9,773,196 | B2* | 9/2017 | Sachs .................. G06K 9/66 |
| 2015/0104102 | A1 | 4/2015 | Carreira et al. |
| 2016/0027148 | A1* | 1/2016 | Choudhury .............. G06T 5/50 382/254 |
| 2016/0358337 | A1* | 12/2016 | Dai .................. G06T 5/10 |
| 2017/0084269 | A1* | 3/2017 | Shi .................. G10L 15/16 |
| 2017/0213112 | A1* | 7/2017 | Sachs .................. G06K 9/66 |
| 2017/0243055 | A1* | 8/2017 | Naveh ............... G06K 9/00302 |
| 2017/0277981 | A1* | 9/2017 | Zhou .................. G06K 9/6297 |
| 2017/0308770 | A1* | 10/2017 | Jetley .................. G06K 9/6256 |

OTHER PUBLICATIONS

Jifeng Dai, et al; "BoxSup: Exploiting Bounding Boxes to Supervise Convolutional Networks for Semantic Segmentation"; arXiv preprint arXiv:1503.01640, 2015; 9 pgs. total.

Jifeng Dai, et al; "Convolutional Feature Masking for Joint Object and Stuff Segmentation"; CVPR, 2015; 9 pgs. total.

Jia Deng, et al; "ImageNet: A Large-Scale Hierarchical Image Database"; CVPR, 2009; 8 pgs. total.

Mark Everingham, et al; "The PASCAL Visual Object Classes (VOC) Challenge"; International Journal of Computer Vision Manuscript No.; 2010; pp. 1-34.

Clement Farabet; "Learning Hierarchical Features for Scene Labeling"; TPAMI; 2013; pp. 1-15.

Ross Girshick, et al; "Rich feature hierarchies for accurate object detection and semantic segmentation Tech report (v5)"; CVPR; 2014; pp. 1-21.

Bharath Hariharan, et al; "Semantic Contours from Inverse Detectors"; ICCV; 2011; 8 pgs. total.

Bharath Hariharan, et al; "Simultaneous Detection and Segmentation"; ECCV; 2014; pp. 1-16.

Bharath Hariharan, et al; "Hypercolumns for Object Segmentation and Fine-grained Localization"; CVPR; 2015; 10 pgs. total.

Sergey Ioffe, et al; "Batch Normalization: Accelerating Deep Network Training by Reducing Internal Covariate Shift"; arXiv preprint arXiv:1502.03167; 2015; pp. 1-11.

Shuiwang Ji, et al; "3D Convolutional Neural Networks for Human Action Recognition"; TPAMI; 2013; 8 pgs. total.

Yangqing Jia, et al; "Caffe: Convolutional Architecture for Fast Feature Embedding"; arXiv preprint arXiv; 2014; 4 pgs. total.

Philipp Krahenbuhl, et al; "Efficient Inference in Fully Connected CRFs with Gaussian Edge Potentials"; NIPS; 2011; pp. 1-9.

Alex Krizhevsky, et al; "ImageNet Classification with Deep Convolutional Neural Networks"; NIPS; 2012; pp. 1-9.

Sijin Li, et al; "3D Human Pose Estimation from Monocular Images with Deep Convolutional Neural Network"; Asian Conference on Computer Vision; 2014; pp. 1-16.

Jonathan Long, et al; "Fully Convolutional Networks for Semantic Segmentation"; CVPR; 2015; 10 pgs. total.

Mohammadreza Mostajabi, et al; "Feedforward semantic segmentation with zoom-out features"; arXiv preprint arXiv; 2014; pp. 1-11.

George Papandreou, et al; "Weakly-and Semi-Supervised Learning of a Deep Convolutional Network for Semantic Image Segmentation"; arXiv preprint arXiv; 2015; pp. 1-12.

Pedro O. Pinheiro, et al; "From Image-level to Pixel-level Labeling with Convolutional Networks"; CVPR; 2015; pp. 1713-1721.

Karen Simonyan, et al; "Two-Stream Convolutional Networks for Action Recognition in Videos"; NIPS; 2014; pp. 1-11.

Karen Simonyan, et al; "Very Deep Convolutional Networks for Large-Scale Image Recognition"; ICLR; 2015; pp. 1-14.

Christian Szegedy, et al; "Going deeper with Convolutions"; arXiv preprint arXiv; 2014; pp. 1-12.

Matthew D. Zeiler, et al; "Visualizing and Understanding Convolutional Networks"; ECCV; 2014; pp. 818-833; 16 pgs. total.

Matthew D. Zeiler, et al; "Adaptive Deconvolutional Networks for Mid and High Level Feature Learning"; ICCV; 2011; 8 pgs. total.

C. Lawrence Zitnick, et al; "Edge Boxes: Locating Object Proposals from Edges"; ECCV; 2014; pp. 1-15.

\* cited by examiner

OBJECT RECOGNITION APPARATUS AND METHOD

CROSS-REFERENCE TO RELATED APPLICATION

This application claims the benefit of U.S. Provisional Application No. 62/158,689, filed on May 8, 2015, in the US Patent Office, and Korean Patent Application No. 10-2015-0162837, filed on Nov. 19, 2015, in the Korean Intellectual Property Office, the disclosures of which are incorporated herein in their entireties by reference.

BACKGROUND

1. Field

The present disclosure relates to an object recognition apparatus and method thereof, and more particularly, to an apparatus and method for recognizing an object in an image by using a convolution network and a deconvolution network.

2. Description of the Related Art

Along with developments in image processing technology and improvements in hardware performance, deep learning has played a crucial role in the field of pattern recognition. Deep learning attempts to model high-level abstractions in data by using multiple processing layers. In addition, as a classification scheme, a convolution network has been used for tackling various visual recognition problems, such as object recognition, object tracking, and motion recognition.

SUMMARY

Provided are apparatuses and methods for recognizing an object in an image by using a convolution network and a deconvolution network.

Additional aspects will be set forth in part in the description which follows and, in part, will be apparent from the description, or may be learned by practice of the presented embodiments.

According to an aspect of an exemplary embodiment, an object recognition apparatus may include a learning unit and a segmentation map determiner. The learning unit may be configured to determine an image feature vector of a first image (i.e., original image) by applying a convolution network to the first image. The convolution network may be used for extracting features from a plurality of image learning sets that include the first image and a sample segmentation map of the first image. The learning unit may be further configured to determine a first segmentation map of the first image by applying a deconvolution network to the determined image feature vector, and determine a weight of the convolution network and a weight of the deconvolution network based on the sample segmentation map and the first segmentation map. The segmentation map determiner may be configured to determine a second segmentation map of a second image (i.e., input image) through the convolution network using the determined weight of the convolution network and through the deconvolution network using the determined weight of the deconvolution network.

The convolution network may include a plurality of convolution layers configured to generate at least one feature map by performing convolution, and a pooling layer configured to down-sample the at least one feature map between the plurality of convolution layers. The deconvolution network may include a plurality of deconvolution layers configured to generate at least one intermediate segmentation map by performing deconvolution, and an unpooling layer configured to up-sample the at least one intermediate segmentation map between the plurality of deconvolution layers.

The weight of the convolution network may be a coefficient of a convolution mask for the plurality of convolution layers, and the weight of the deconvolution network may be a coefficient of a deconvolution mask for the plurality of deconvolution layers.

The pooling layer may be a max-pooling layer.

The unpooling layer may correspond to the max-pooling layer.

The plurality of image learning sets may include a third image, which is obtained by extracting only one object from the first image, and a second sample segmentation map of the third image.

According to an aspect of another embodiment, an object recognition method may include: determining an image feature vector of a first image by applying, to the first image, a convolution network for extracting features from a plurality of image learning sets including the first image and a sample segmentation map of the first image; determining a first segmentation map of the first image by applying a deconvolution network to the determined image feature vector; determining a weight of the convolution network and a weight of the deconvolution network based on the sample segmentation map and the first segmentation map; and determining a second segmentation map of a second image through the convolution network using the determined weight of the convolution network and through the deconvolution network using the determined weight of the deconvolution network.

The convolution network may include a plurality of convolution layers configured to generate at least one feature map by performing convolution, and a pooling layer configured to down-sample the feature map between the convolution layers. The deconvolution network may include a plurality of deconvolution layers configured to generate at least one intermediate segmentation map by performing deconvolution, and an unpooling layer configured to up-sample the at least one intermediate segmentation map between the plurality of deconvolution layers.

The weight of the convolution network may be a coefficient of a convolution mask for the plurality of convolution layers, and the weight of the deconvolution network may be a coefficient of a deconvolution mask for the plurality of deconvolution layers.

The pooling layer may be a max-pooling layer.

The unpooling layer may correspond to the max-pooling layer.

The plurality of image learning sets may include a third image, which is obtained by extracting only one object from the first image, and a second sample segmentation map of the third image.

According to an aspect of another embodiment, an image magnification apparatus may include a learning unit and a super-resolution image determiner. The learning unit may be configured to determine an image feature vector of a first image by applying a convolution network to the first image. The convolution network may be used for extracting features from a plurality of image learning sets including the first image and a sample super-resolution image of the first image, determine a first super-resolution image of the first image by applying a deconvolution network to the determined image feature vector, and determine a weight of the convolution network and a weight of the deconvolution network based on the sample super-resolution image and the first super-resolution image. The super-resolution image determiner may be configured to determine a second super-resolution image of a second input image through the convolution network using the determined weight of the convolution network and through the deconvolution network using the determined weight of the deconvolution network.

According to an aspect of another embodiment, a non-transitory computer-readable storage medium may store instructions which, when executed by a processor, cause the processor to perform operations. The operations may include: determining an image feature vector of a first image by applying, to the first image, a convolution network for extracting features from a plurality of image learning sets including the first image and a sample segmentation map of the first image; determining a first segmentation map of the first image by applying a deconvolution network to the determined image feature vector; determining a weight of the convolution network and a weight of the deconvolution network based on the sample segmentation map and the first segmentation map; and determining a second segmentation map of a second input image through the convolution network using the determined weight of the convolution network and through the deconvolution network using the determined weight of the deconvolution network.

The convolution network may include a plurality of convolution layers configured to generate at least one feature map by performing convolution, and a pooling layer configured to down-sample the at least one feature map between the plurality of convolution layers. The deconvolution network may include a plurality of deconvolution layers configured to generate at least one intermediate segmentation map by performing deconvolution, and an unpooling layer configured to up-sample the at least one intermediate segmentation map between the plurality of deconvolution layers.

The weight of the convolution network may be a coefficient of a convolution mask for the plurality of convolution layers, and the weight of the deconvolution network may be a coefficient of a deconvolution mask for the plurality of deconvolution layers.

The pooling layer may be a max-pooling layer.

The unpooling layer may correspond to the max-pooling layer.

The plurality of image learning sets may include a third image, which is obtained by extracting only one object from the first image, and a second sample segmentation map of the third extracted image.

The weight of the convolution network and the weight of the deconvolution network may be determined by using at least one of a gradient descent scheme and a batch normalization scheme.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
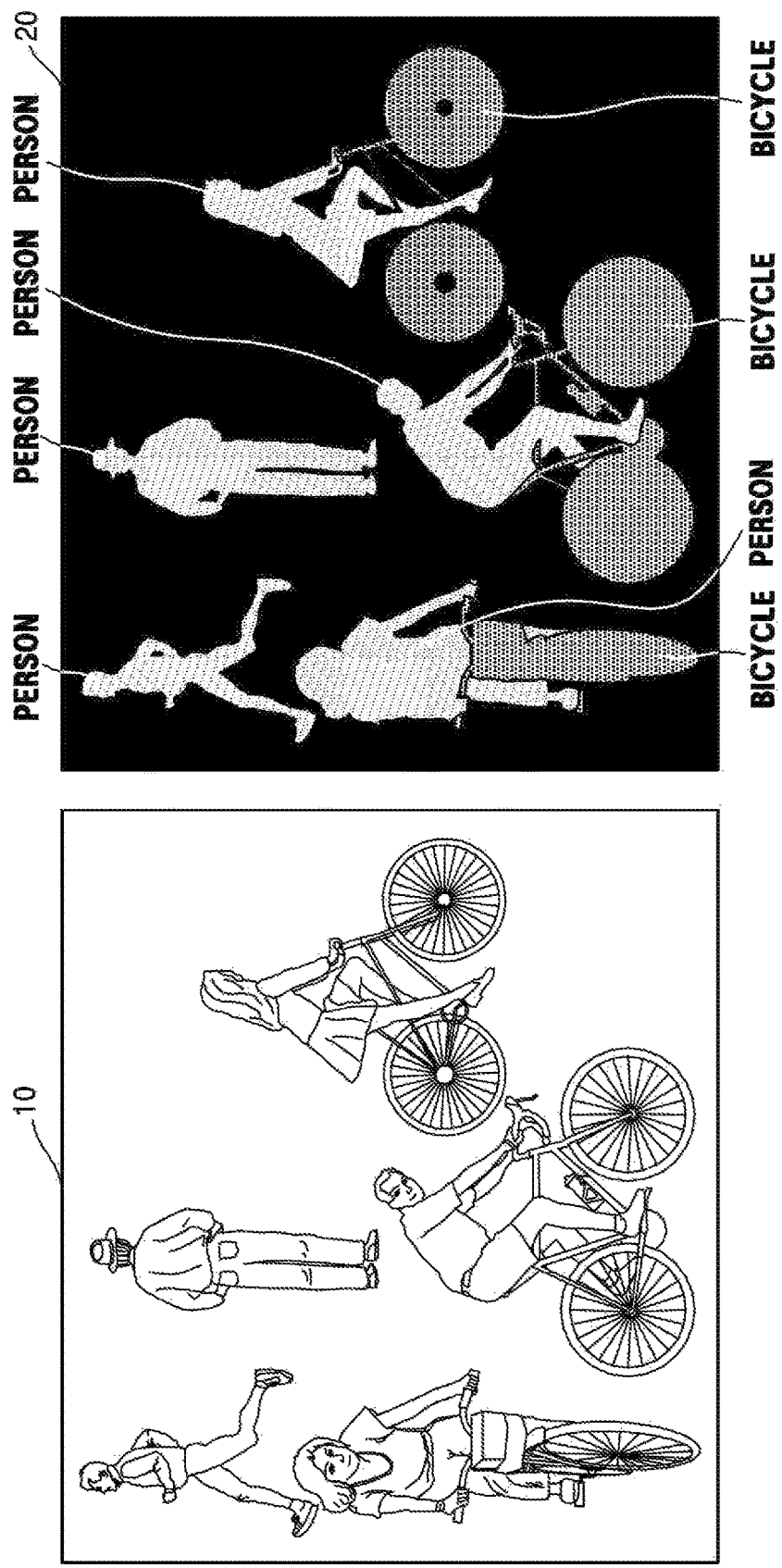
FIG. 1 illustrates an exemplary input image and an exemplary segmentation map of the input image.

The terms used in the specification will be described, and then, the disclosed embodiments will be described in detail.

The terms used in this specification are those general terms currently widely used in the art, but the terms may vary according to the intention of those of ordinary skill in the art, precedents, or new technology in the art. Also, specified terms may be adopted by the applicant, and in this case, the detailed meaning thereof will be described in the detailed description. Thus, the terms used in the specification should be construed not as mere labels but based on the meaning of the terms and the overall description provided.

Throughout the disclosure, it will also be understood that when a component "includes" an element, unless otherwise indicated, it should be understood that the component does not exclude other elements but may further include more elements. In addition, terms such as "unit," "module," or the like may refer to elements or components that perform at least one function or operation, and the elements or components may be implemented as hardware, software, or as a combination of both hardware and software.

Moreover, it should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The terms used in the present disclosure are used to explain an arbitrary exemplary embodiment, and may not intend to limit the scope of another exemplary embodiment. In addition, in the present specification, a singular expression may be used for convenience of explanation, but unless the expression has an obvious different meaning in the context, it may be understood as a concept that includes plural expressions as well.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

Reference will now be made in detail to exemplary embodiments, examples of which are illustrated in the accompanying drawings. In the drawings, elements that are well understood in the art are omitted to clearly describe the exemplary embodiments, and like reference numerals denote like elements throughout the disclosure. In this regard, the present exemplary embodiments may have different forms and should not be construed as being limited to the descriptions set forth herein. Accordingly, the exemplary embodiments are described below, by referring to the figures, to explain aspects. As used herein, expressions such as "at least one of," when preceding a list of elements, modify the entire list of elements and do not modify the individual elements of the list.

FIG. 1 illustrates an exemplary input image 10 and an exemplary segmentation map 20 of the input image 10.

Referring to FIG. 1, in an object recognition process, the segmentation map 20 of the input image 10 may be obtained with respect to the given input image 10. Object recognition may indicate that a region recognized as an object in an arbitrary image is classified as one of a plurality of preset classes. The term "object" may indicate a particular matter found in an image. For example, people, bicycles, and the like may be objects in the input image 10.

According to an aspect of an exemplary embodiment, object recognition may be performed through machine learning. With machine learning, if a classifier performs learning by using a learning set that includes a feature vector and then an arbitrary image having the feature vector is inputted to the classifier that completed the learning, the classifier may determine which one of a plurality of classes a region recognized as an object belongs to and output a corresponding class.

Figure 2:
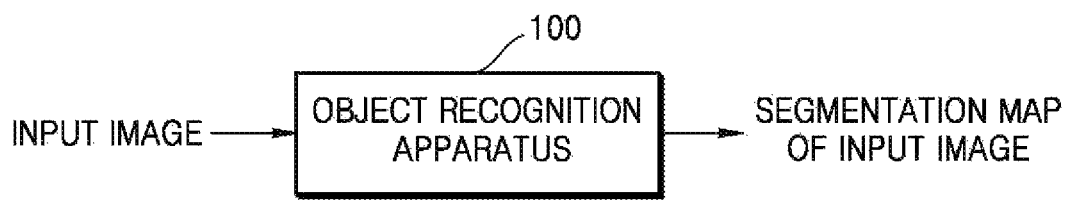
FIG. 2 illustrates a configuration of an exemplary object recognition apparatus.

FIG. 2 illustrates a configuration of an exemplary object recognition apparatus 100.

Referring to FIG. 2, the object recognition apparatus 100 may use a neural network to process an input image and produce a segmentation map of the input image. The object recognition apparatus 100 using the neural network may perform learning. The object recognition apparatus 100 may have capabilities for generalization and parallel processing. The neural network may be used in various fields such as object recognition, prediction, evaluation, synthesis, and control. The neural network used in the object recognition apparatus 100 may include one or more perceptrons, each of which may be either a linear classifier or a multilayer perceptron.

Figure 3:
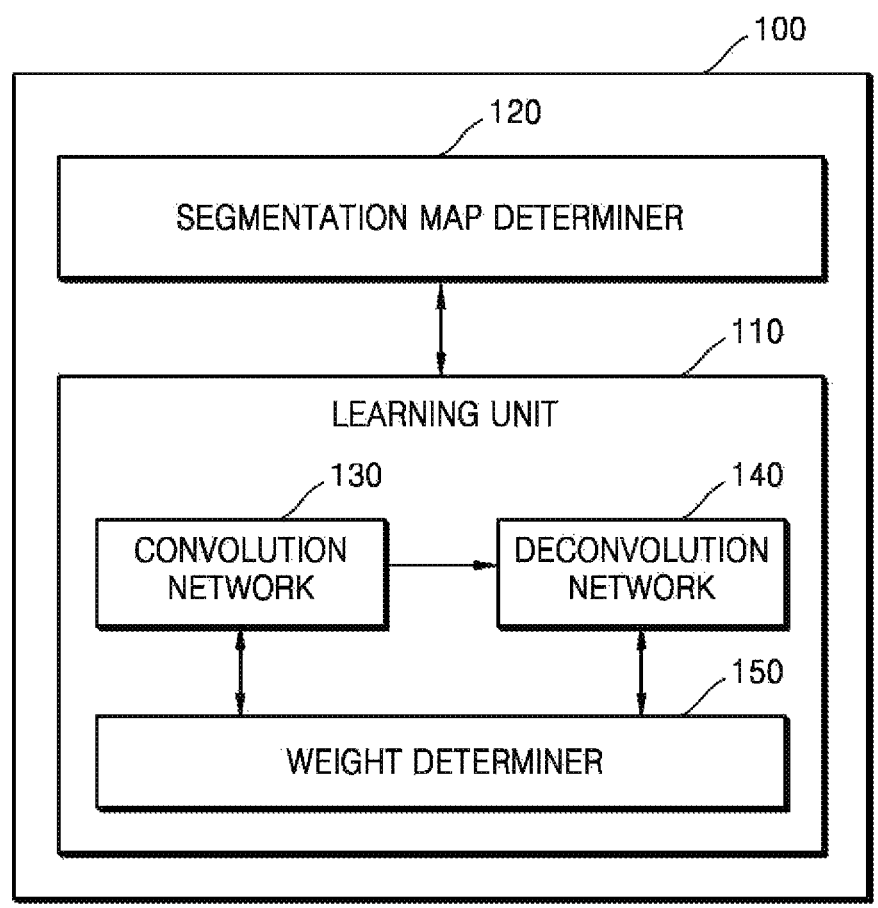
FIG. 3 illustrates a block diagram of an exemplary object recognition apparatus.

FIG. 3 illustrates a block diagram of the exemplary object recognition apparatus 100.

Referring to FIG. 3, the object recognition apparatus 100 may include a learning unit 110 and a segmentation map determiner 120. The learning unit 110 may include a convolution network 130, a deconvolution network 140, and a weight determiner 150.

The learning unit 110 may determine an image feature vector of an original image by using the convolution network 130 (also referred to as a "convolutional neural network") for extracting features from a plurality of image learning sets that include the original image and a sample segmentation map of the original image. The original image may be an image prepared for training the learning unit 110 and the sample segmentation map may be a known segmentation map that corresponds to the original image. The learning unit 110 may also determine a segmentation map of the original image by using the deconvolution network 140 from the determined image feature vector, and determine a weight of the convolution network 130 and a weight of the deconvolution network 140 by using the sample segmentation map and the determined segmentation map.

The convolution network 130 may determine the image feature vector of the original image by using the plurality of image learning sets including the original image and the sample segmentation map of the original image. According to an aspect of an exemplary embodiment, the convolution network 130 may include a plurality of convolution layers configured to generate at least one feature map by performing convolution and a pooling layer configured to downsample the feature map between the plurality of convolution layers. According to an aspect of an exemplary embodiment, the pooling layer may be a max-pooling layer.

The deconvolution network 140 may determine the segmentation map of the original image by using the image feature vector determined by the convolution network 130. According to an aspect of an exemplary embodiment, the deconvolution network 140 may include a plurality of deconvolution layers configured to generate at least one intermediate segmentation map by performing deconvolution and a plurality of unpooling layers configured to upsample the intermediate segmentation map between the deconvolution layers. According to an aspect of an exemplary embodiment, the unpooling layers may correspond to the max-pooling layer.

The weight determiner 150 may determine a weight of the convolution network 130 and a weight of the deconvolution network 140 by using the sample segmentation map of the original image and the segmentation map determined by the deconvolution network 140. According to an aspect of an exemplary embodiment, the weight of the convolution network 130 may be a coefficient of a convolution mask for the convolution layers, and the weight of the deconvolution network 140 may be a coefficient of a deconvolution mask for the deconvolution layers. According to an aspect of an exemplary embodiment, the weight determiner 150 may use an image learning set including an image obtained by extracting only one object from the original image and a sample segmentation map of the extracted image.

The segmentation map determiner 120 may determine a segmentation map of an input image from the input image through the convolution network 130 using the weight of the convolution network 130, which has been determined by the weight determiner 150, and through the deconvolution network 140 using the weight of the deconvolution network 140, which has been determined by the weight determiner 150.

Figure 4:
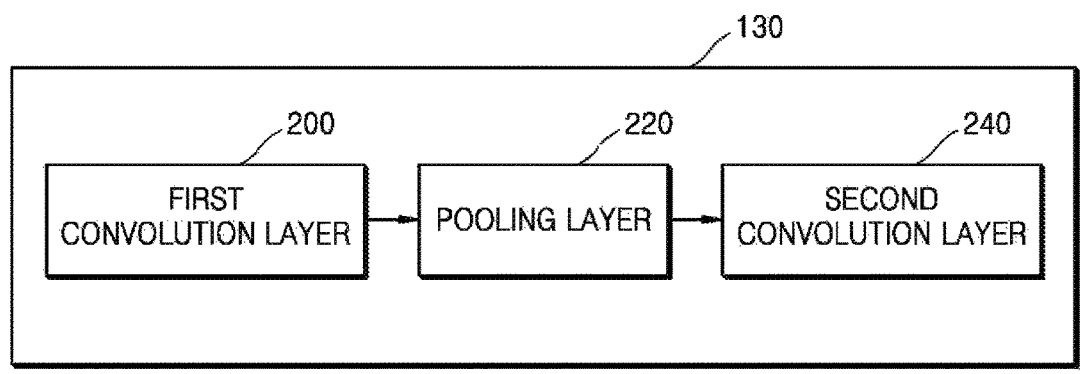
FIG. 4 illustrates a block diagram of an operation of an exemplary convolution network.

FIG. 4 illustrates a block diagram of an operation of the exemplary convolution network 130.

The convolution network 130 may include a plurality of convolution layers 200, 240 configured to generate at least one feature map by performing convolution. The convolution network 130 may also include a pooling layer 220 configured to down-sample the feature map between the plurality of convolution layers 200, 240.

Referring to FIG. 4, the convolution network 130 according to an aspect of an exemplary embodiment may include a first convolution layer 200, a second convolution layer 240, and a pooling layer 220. Each of the first convolution layer 200 and the second convolution layer 240 may generate at least one feature map by performing convolution, and the pooling layer 220 may be provided between the first convolution layer 200 and the second convolution layer 240. A size, a coefficient, and the like of a convolution mask may vary for each of the first convolution layer 200 and the second convolution layer 240. Since the convolution network 130 may include a plurality of convolution layers, the convolution network 130 may include at least one convolution layer in addition to the first convolution layer 200 and the second convolution layer 240.

Figure 5:
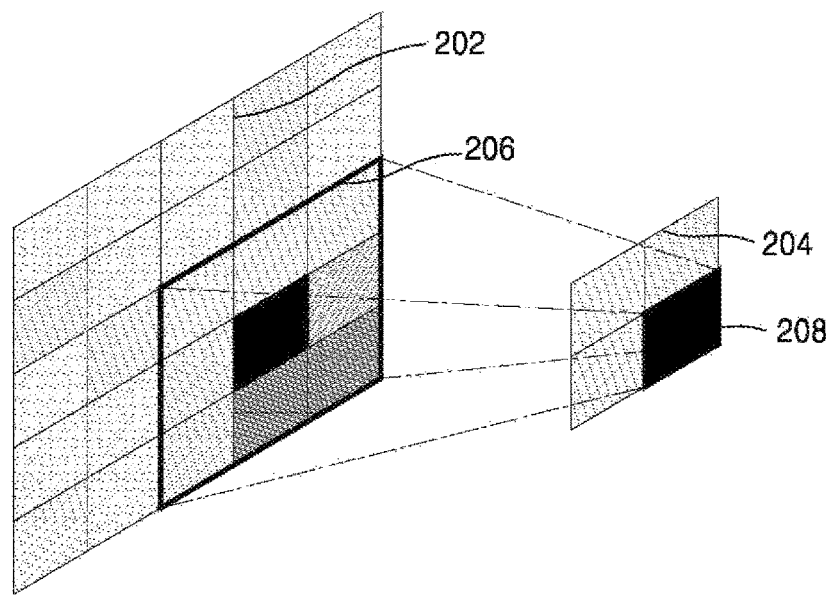
FIG. 5 illustrates an operation of an exemplary convolution layer.

FIG. 5 illustrates an operation of an exemplary convolution layer.

The convolution layer according to an exemplary embodiment may generate at least one feature map by performing convolution. The convolution layer may perform convolution on an input image to extract various features of the image.

Referring to FIG. 5, the convolution layer may generate a feature map 204 by performing convolution on an input image 202. The input image 202 may be an original image to be used for the object recognition apparatus 100 to learn, an arbitrary image to be used for object recognition after learning, a feature map obtained by performing convolution, or a feature map down-sampled by a pooling layer.

Referring to FIG. 5, when convolution is performed using a 3×3 convolution mask 206 for the input image 202, a convolution result value 208 of a corresponding region of the input image 202 may be obtained. According to an aspect of an exemplary embodiment, a coefficient of the convolution mask 206 may be determined by the weight determiner 150. Although FIG. 5 shows a convolution mask 206 having a 3×3 configuration, one of ordinary skill in the art will understand that a convolution mask 206 having a different size, dimension, or configuration may also be used.

Figure 6:
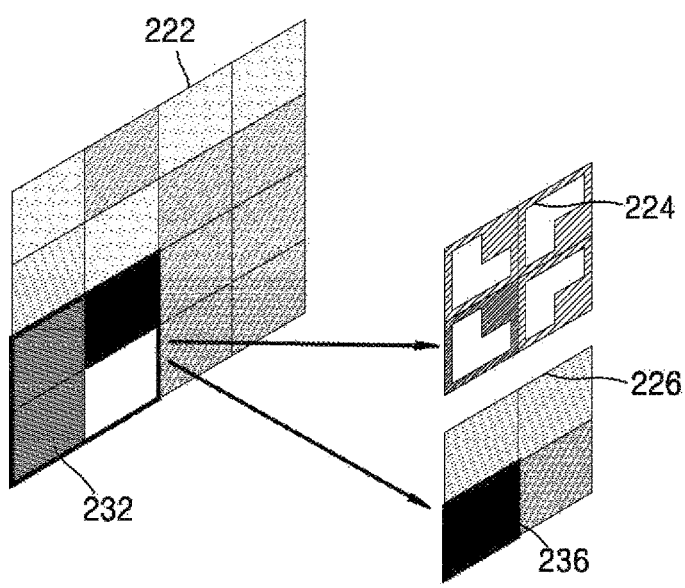
FIG. 6 illustrates an operation of an exemplary pooling layer.

FIG. 6 illustrates an operation of the exemplary pooling layer 220.

The pooling layer 220 according to an embodiment may down-sample a feature map between a plurality of convolution layers. Invariance with respect to movement, rotation, size change, and the like of an image pattern may be secured through down-sampling.

Referring to FIG. 6, the pooling layer 220 may generate an output image 226 having a smaller size than a size of an input image 222 by down-sampling the input image 222. The input image 222 may be an original image to be used for the object recognition apparatus 100 to learn, an arbitrary image to be used for object recognition after learning, or a feature map obtained by performing convolution.

According to an aspect of an exemplary embodiment, the down-sampling may use max pooling but is not limited thereto. The max pooling may reduce the size of an image through a method of collecting only the sample having the maximum value with respect to each partial region and removing the remaining samples.

The pooling layer 220 may obtain a pooling result value 236 of a corresponding region of the input image 222 by using a 2×2 max-pooling mask 232 to down-sample the input image 222. The max-pooling mask 232 may be of a different size, dimension, or configuration. In addition, a switch variables map 224 may store the max-pooling mask 232. This is to use, in an unpooling layer of the deconvolution network 140, an unpooling mask corresponding to the max-pooling mask 232 used in the pooling layer 220.

Figure 7:
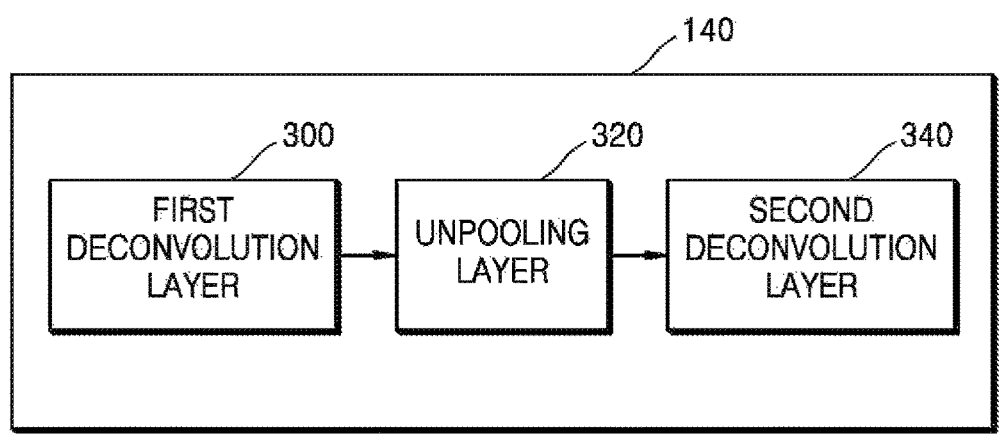
FIG. 7 illustrates a block diagram of an operation of an exemplary deconvolution network.

FIG. 7 illustrates a block diagram of an operation of the exemplary deconvolution network 140.

The deconvolution network 140 may include a plurality of deconvolution layers 300, 340 configured to generate at least one intermediate segmentation map by performing deconvolution. The deconvolution network 140 may further include a plurality of unpooling layers 320 configured to up-sample the intermediate segmentation map between the deconvolution layers 300, 340.

Referring to FIG. 7, the deconvolution network 140 according to an embodiment may include a first deconvolution layer 300, a second deconvolution layer 340, and an unpooling layer 320. Each of the first deconvolution layer 300 and the second deconvolution layer 340 may generate at least one intermediate segmentation map by performing deconvolution, and the unpooling layer 320 may be provided between the first deconvolution layer 300 and the second deconvolution layer 340. A size, a coefficient, and the like of a deconvolution mask may vary for each of the first deconvolution layer 300 and the second deconvolution layer 340. Because the deconvolution network 140 may include a plurality of deconvolution layers, the deconvolution network 140 may include at least one deconvolution layer in addition to the first deconvolution layer 300 and the second deconvolution layer 340.

Figure 8:
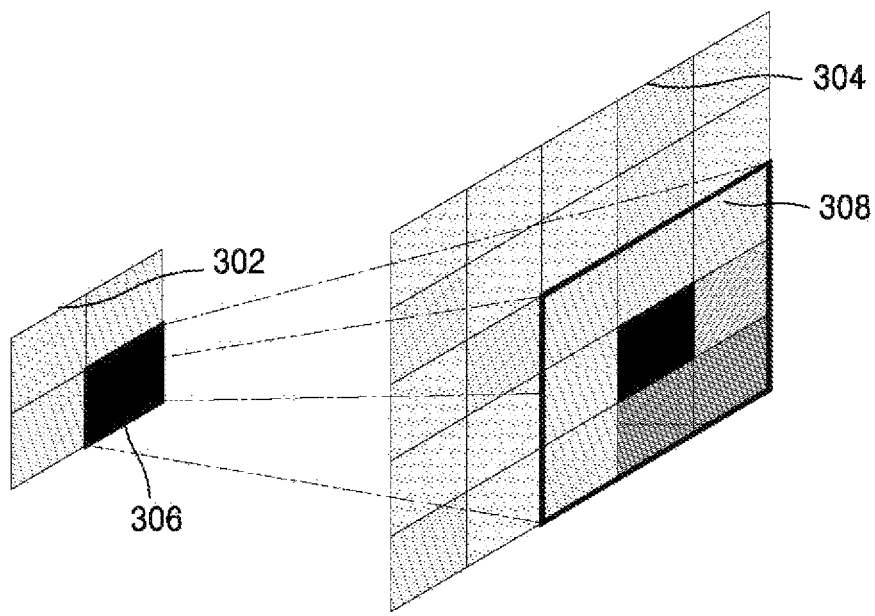
FIG. 8 illustrates a diagram of an operation of an exemplary deconvolution layer.

FIG. 8 illustrates a diagram of an operation of an exemplary deconvolution layer.

The deconvolution layer according to an aspect of an exemplary embodiment may generate at least one intermediate segmentation map by performing deconvolution. The deconvolution layer may perform deconvolution on an input image to extract various intermediate segmentation maps.

Referring to FIG. 8, the deconvolution layer may generate an intermediate segmentation map 304 by performing deconvolution on an input image 302. The input image 302 may be an image feature vector obtained by the convolution network 130, an intermediate segmentation map obtained by performing deconvolution, or an intermediate segmentation map up-sampled by an unpooling layer.

When deconvolution on the input image 302 is performed using a 3×3 deconvolution mask 306, a deconvolution result value 308 of a corresponding region of the input image 302 may be obtained. According to an aspect of an exemplary embodiment, a coefficient of the deconvolution mask 306 may be determined by the weight determiner 150. In addition, the deconvolution mask 306 may be of a different size, dimension, configuration, etc.

Figure 9:
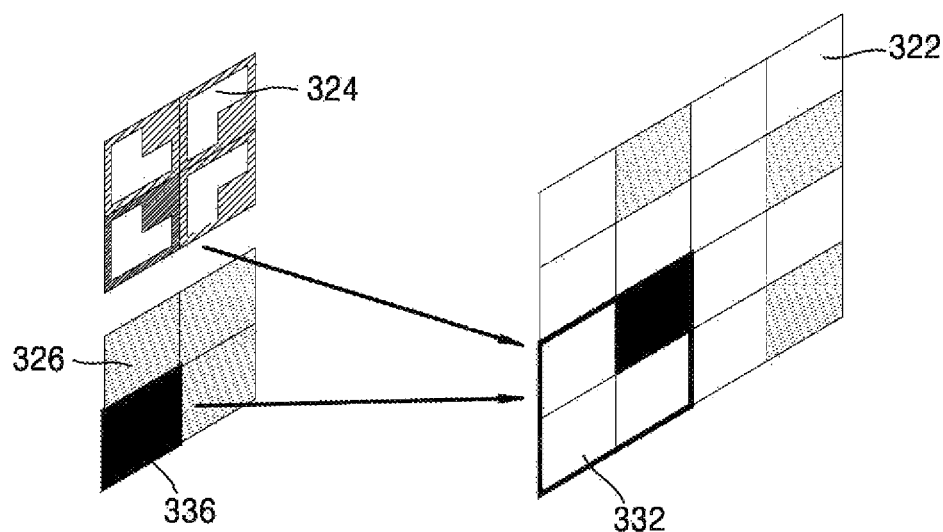
FIG. 9 illustrates a diagram of an operation of an exemplary unpooling layer.

FIG. 9 illustrates a diagram of an operation of the exemplary unpooling layer 320.

The unpooling layer 320 according to an aspect of an exemplary embodiment may up-sample an intermediate segmentation map between a plurality of deconvolution layers. The unpooling layer 320 may perform up-sampling to generate a segmentation map having a size of an original image from the intermediate segmentation map. The unpooling layer 320 may correspond to the pooling layer 220 but is not limited thereto.

Referring to FIG. 9, the unpooling layer 320 may obtain an output image 322 having a larger size than the size of an input image 326 by up-sampling the input image 326. The input image 326 may be an image feature vector obtained by the convolution network 130, an intermediate segmentation map obtained by performing deconvolution, or an intermediate segmentation map up-sampled by an unpooling layer 320.

According to an aspect of an exemplary embodiment, the pooling layer 220 may use max pooling, and the unpooling layer 320 may use an unpooling mask corresponding to the max pooling, but the present embodiment is not limited thereto.

Referring to FIG. 9, the unpooling layer 320 may use an unpooling mask 336 corresponding to the 2×2 max-pooling mask 232 of FIG. 6 and also use a switch variables map 324 corresponding to the switch variables map 224 of FIG. 6. According to an aspect of an exemplary embodiment, the switch variables map 224 of FIG. 6 may be the same as the switch variables map 324 of FIG. 9. Referring to FIG. 9, the unpooling layer 320 may obtain unpooling result values 332 of a corresponding region of the input image 326 by using the 2×2 max-unpooling mask 336 to up-sample the input image 326.

Referring to FIG. 3, the weight determiner 150 may determine a weight of the convolution network 130 and a weight of the deconvolution network 140 by using a sample segmentation map of an original image and a segmentation map determined by the deconvolution network 140. According to an aspect of an exemplary embodiment, the weight of the convolution network 130 may be a coefficient of a convolution mask for a convolution layer, and the weight of the deconvolution network 140 may be a coefficient of a deconvolution mask for a deconvolution layer. According to an aspect of an exemplary embodiment, the weight determiner 150 may use an image learning set including an image obtained by extracting only one object from the original image and a sample segmentation map of the extracted image.

According to an aspect of an exemplary embodiment, the weight determiner 150 may determine a weight of the convolution network 130 and a weight of the deconvolution network 140, by which a difference between a sample segmentation map of an original image and a segmentation map determined by the deconvolution network 140 may be minimized. For example, the weight determiner 150 may determine a weight of the convolution network 130 and a weight of the deconvolution network 140 by using a gradient descent scheme. In addition, the weight determiner 150 may use a batch normalization scheme to prevent a poor local optimum solution.

According to an aspect of an exemplary embodiment, the weight determiner 150 may use a two-stage training strategy. The two-stage training strategy refers to a method of first determining a weight of the convolution network 130 and a weight of the deconvolution network 140 by using an easy image learning set and then subsequently determining a final weight of the convolution network 130 and a final weight of the deconvolution network 140 by using an image learning set of an original image. The easy image learning set may include an image obtained by extracting only one object from an original image and a sample segmentation map of the extracted image.

Figure 10:
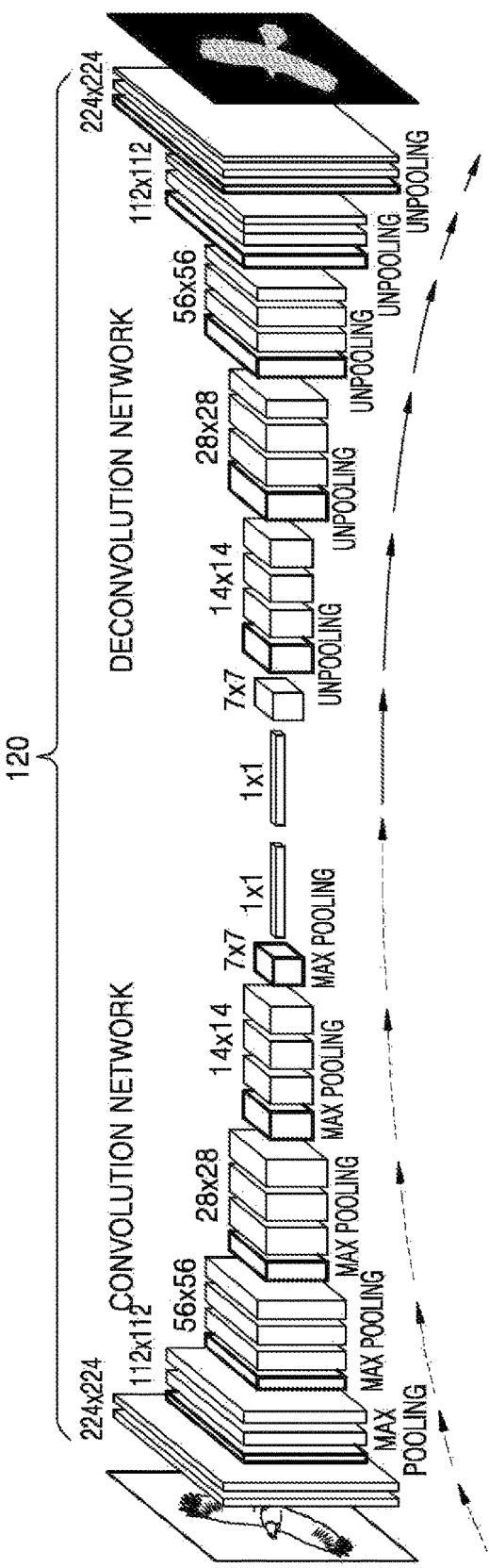
FIG. 10 illustrates a diagram of an operation of an exemplary segmentation map determiner.

FIG. 10 illustrates a diagram of an operation of the exemplary segmentation map determiner 120.

The segmentation map determiner 120 may determine a segmentation map of an input image from the input image through the convolution network 130 using a weight of the convolution network 130, which has been determined by the weight determiner 150, and the deconvolution network 140 using a weight of the deconvolution network 140, which has been determined by the weight determiner 150.

The segmentation map determiner 120 may perform the same operation of the convolution network 130, which has been described with reference to FIGS. 4 through 6. In addition, the segmentation map determiner 120 may perform the same operation of the deconvolution network 140, which has been described with reference to FIGS. 7 through 9.

Referring to FIG. 10, according to an aspect of an exemplary embodiment, an input image may have a size of 224×224, and an output image may have the same size of 224×224 as that of the input image. The convolution network 130 may include a plurality of convolution layers configured to generate at least one feature map by performing convolution and a pooling layer configured to down-sample the feature map between the plurality of convolution layers. The convolution network 140 may include a plurality of deconvolution layers configured to generate at least one intermediate segmentation map by performing deconvolution and a plurality of unpooling layers configured to up-sample the intermediate segmentation map between the plurality of deconvolution layers. The convolution network 130 may use a weight of the convolution network 130, which has been determined by the weight determiner 150, and the deconvolution network 140 may use a weight of the deconvolution network 140, which has been determined by the weight determiner 150. Referring to FIG. 10, the pooling layer may use a 2×2 max-pooling mask.

The segmentation map determiner 120 may generate a segmentation map by performing only one forward calculation on an input image because the weight of the convolution network 130 and the weight of the deconvolution network 140 are determined after the completion of learning.

Figure 11:
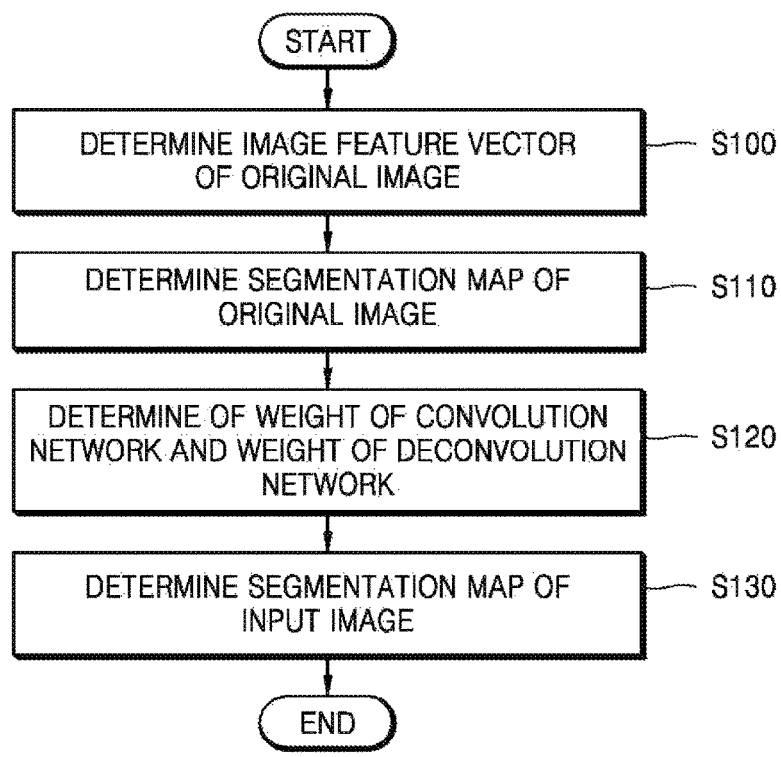
FIG. 11 illustrates a flowchart of an exemplary object recognition method.

FIG. 11 illustrates a flowchart of an exemplary object recognition method. The steps outlined herein are exemplary and can be implemented in any combination thereof, including combinations that exclude, add, or modify certain steps.

In step S100, an image feature vector of an original image may be determined using a convolution network for extracting features from a plurality of image learning sets that include the original image and a sample segmentation map of the original image.

In step S110, a segmentation map of the original image may be determined using a deconvolution network from the image feature vector determined in step S100.

In step S120, a weight of the convolution network and a weight of the deconvolution network may be determined using the sample segmentation map of the original image and the segmentation map determined in step S110.

In step S130, a segmentation map of the input image may be determined from the input image through the deconvolution network using the weight of the convolution network, which has been determined in step S120, and through the deconvolution network using the weight of the deconvolution network, which has been determined in step S120.

Figure 12:
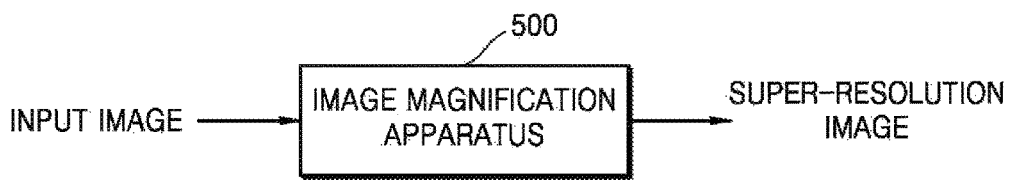
FIG. 12 illustrates a configuration of an exemplary image magnification apparatus.

FIG. 12 illustrates a configuration of an exemplary image magnification apparatus 500.

Referring to FIG. 12, the image magnification apparatus 500 may output a super-resolution image of an input image. According to an aspect of an exemplary embodiment, the image magnification apparatus 500 may use a neural network. The magnification apparatus 500 may perform learning using a neural network, and have capabilities for generalization and parallel processing. The neural network may be used in various fields such as object recognition, prediction, evaluation, synthesis, and control. The neural network used for the image magnification apparatus 500 may include a perceptron, which may either be a single-layer perceptron (i.e., a linear classifier) or a multi-layer perceptron (i.e., a nonlinear classifier).

According to an aspect of an exemplary embodiment, the image magnification apparatus 500 may include a learning unit and a super-resolution image determiner. The learning unit may include a convolution network, a deconvolution network, and a weight determiner.

The learning unit may determine an image feature vector of an original image by using the convolution network for extracting features from a plurality of image learning sets that include the original image and a sample super-resolution image of the original image. The learning unit may also determine a super-resolution image of the original image by using the determined image feature vector and the deconvolution network. The learning unit may further determine a weight of the convolution network and a weight of the deconvolution network by using the sample segmentation map and the determined super-resolution image.

The super-resolution image determiner may determine a super-resolution image of an input image from the input image through the convolution network using the determined weight of the convolution network and through the deconvolution network using the determined weight of the deconvolution network.

The object recognition method according to an aspect of an exemplary embodiment may be implemented as computer instructions stored in a non-transitory computer-readable storage medium and executable by a processor and other computer means. The non-transitory computer-readable storage medium may include program commands, data files, data structures, or a combination thereof. The program commands stored in the computer-readable recording medium may be specially designed and constructed for the embodiments of the present disclosure. Examples of the non-transitory computer-readable storage medium include storage media and devices such as magnetic media (e.g., hard disks, floppy disks, magnetic tapes, etc.), optical media (e.g., compact disc read-only memories (CD-ROMs), digital versatile discs (DVDs), Blu-ray discs, etc.), magneto-optical media (e.g., floptical discs, etc.), and hardware devices that are specially configured to store and carry out program commands (e.g., read-only memory (ROM), random access memory (RAM), flash memory, solid-state drives (SSDs), etc.). Examples of the program commands include high-level language code that may be executed by a computer using an interpreter as well as machine language code produced by a complier.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An object recognition apparatus comprising:
    a learning unit configured to:
        determine an image feature vector of a first image by applying, to the first image, a convolution network for extracting features from a plurality of image learning sets including the first image and a sample segmentation map of the first image;
        determine a first segmentation map of the first image by applying a deconvolution network to the determined image feature vector; and
        determine a weight of the convolution network and a weight of the deconvolution network based on the sample segmentation map and the first segmentation map; and
    a segmentation map determiner configured to determine a second segmentation map of a second image through the convolution network using the determined weight of the convolution network and through the deconvolution network using the determined weight of the deconvolution network.

2. The object recognition apparatus of claim 1, wherein the convolution network comprises:
    a plurality of convolution layers configured to generate at least one feature map by performing convolution; and
    a pooling layer configured to down-sample the at least one feature map between the plurality of convolution layers; and
    wherein the deconvolution network comprises:
        a plurality of deconvolution layers configured to generate at least one intermediate segmentation map by performing deconvolution; and
        an unpooling layer configured to up-sample the at least one intermediate segmentation map between the plurality of deconvolution layers.

3. The object recognition apparatus of claim 2, wherein the weight of the convolution network is a coefficient of a convolution mask for the plurality of convolution layers, and the weight of the deconvolution network is a coefficient of a deconvolution mask for the plurality of deconvolution layers.

4. The object recognition apparatus of claim 2, wherein the pooling layer is a max-pooling layer.

5. The object recognition apparatus of claim 4, wherein the unpooling layer corresponds to the max-pooling layer.

6. The object recognition apparatus of claim 1, wherein the plurality of image learning sets comprise a third image, which is obtained by extracting only one object from the first image, and a second sample segmentation map of the third extracted image.

7. An object recognition method comprising:
    determining an image feature vector of a first image by applying, to the first image, a convolution network for extracting features from a plurality of image learning sets including the first image and a sample segmentation map of the first image;
    determining a first segmentation map of the first image by applying a deconvolution network to the determined image feature vector;
    determining a weight of the convolution network and a weight of the deconvolution network based on the sample segmentation map and the first segmentation map; and
    determining a second segmentation map of a second input image through the convolution network using the determined weight of the convolution network and through the deconvolution network using the determined weight of the deconvolution network.

8. The object recognition method of claim 7, wherein the convolution network comprises:
   a plurality of convolution layers configured to generate at least one feature map by performing convolution; and
   a pooling layer configured to down-sample the at least one feature map between the plurality of convolution layers; and
wherein the deconvolution network comprises:
   a plurality of deconvolution layers configured to generate at least one intermediate segmentation map by performing deconvolution, and
   an unpooling layer configured to up-sample the at least one intermediate segmentation map between the plurality of deconvolution layers.

9. The object recognition method of claim 8, wherein the weight of the convolution network is a coefficient of a convolution mask for the plurality of convolution layers, and the weight of the deconvolution network is a coefficient of a deconvolution mask for the plurality of deconvolution layers.

10. The object recognition method of claim 8, wherein the pooling layer is a max-pooling layer.

11. The object recognition method of claim 10, wherein the unpooling layer corresponds to the max-pooling layer.

12. The object recognition method of claim 7, wherein the plurality of image learning sets comprise a third image, which is obtained by extracting only one object from the first image, and a second sample segmentation map of the third extracted image.

13. An image magnification apparatus comprising:
   a learning unit configured to:
      determine an image feature vector of a first image by applying, to the first image, a convolution network for extracting features from a plurality of image learning sets including the first image and a sample super-resolution image of the first image;
      determine a first super-resolution image of the first image by applying a deconvolution network to the determined image feature vector; and
      determine a weight of the convolution network and a weight of the deconvolution network based on the sample super-resolution image and the first super-resolution image; and
   a super-resolution image determiner configured to determine a second super-resolution image of a second image through the convolution network using the determined weight of the convolution network and through the deconvolution network using the determined weight of the deconvolution network.

* * * * *